United States Patent
Schwartzentruber et al.

(10) Patent No.: US 8,246,739 B2
(45) Date of Patent: Aug. 21, 2012

(54) CONCRETE WITH A LOW CLINKER CONTENT

(75) Inventors: Arnaud Schwartzentruber, Genas (FR); Emmanuel Garcia, Saint-Didier de la Tour (FR)

(73) Assignee: Lafarge, Paris (FR)

( * ) Notice: Subject to any disclaimer, the term of this patent is extended or adjusted under 35 U.S.C. 154(b) by 173 days.

(21) Appl. No.: 12/679,542

(22) PCT Filed: Sep. 24, 2008

(86) PCT No.: PCT/IB2008/003968
§ 371 (c)(1),
(2), (4) Date: Mar. 23, 2010

(87) PCT Pub. No.: WO2009/074886
PCT Pub. Date: Jun. 18, 2009

(65) Prior Publication Data
US 2010/0294171 A1    Nov. 25, 2010

(30) Foreign Application Priority Data
Sep. 25, 2007    (FR) ........................ 07 06703

(51) Int. Cl.
*C04B 7/02*    (2006.01)
*C04B 7/14*    (2006.01)

(52) U.S. Cl. ........ 106/713; 106/705; 106/716; 106/718; 106/737; 106/789

(58) Field of Classification Search .......... 106/713, 106/705, 716, 718, 737, 789
See application file for complete search history.

(56) References Cited

U.S. PATENT DOCUMENTS

| | | | |
|---|---|---|---|
| 4,419,136 A | 12/1983 | Rice | |
| 5,423,634 A | 6/1995 | Fujita et al. | |
| 5,478,391 A | 12/1995 | Babaev et al. | |
| 5,935,313 A | 8/1999 | Ficinski | |
| 6,797,370 B1 | 9/2004 | Bechtoldt et al. | |

FOREIGN PATENT DOCUMENTS

| | | |
|---|---|---|
| EP | 0 696 558 | 2/1996 |
| EP | 0789006 | 8/1997 |
| EP | 1702899 | 9/2006 |
| FR | 2650837 | 2/1991 |
| FR | 2774683 | 8/1999 |
| JP | 10-245555 | 9/1998 |
| JP | 2002-265241 | 9/2002 |
| WO | WO 93/21122 | 10/1993 |
| WO | WO 01/36345 | 5/2001 |
| WO | WO 2004/041746 | 5/2004 |
| WO | WO 2005/110945 | 11/2005 |
| WO | WO 2007/132098 | 11/2007 |

OTHER PUBLICATIONS

Chikamatsu et al., "High-Flowability Concrete Compositions", Chemical Abstracts, American Chemical Society, US, vol. 118, No. 12, Mar. 22, 1993, pp. 438.

*Primary Examiner* — Paul Marcantoni
(74) *Attorney, Agent, or Firm* — Pillsbury Winthrop Shaw Pittman, LLP (57) ABSTRACT

A process for the preparation of a wet concrete composition, including mixing Portland clinker in the form of grains having a Dv97 from 10 to 30 μm or having a Blaine specific surface greater than or equal to 5300 $cm^2/g$; slag; calcium sulphate; complementary materials, having a Dv90 less than or equal to 200 μm; from 1500 to 2200 $kg/m^3$ of aggregates; a plasticizer; optionally an accelerator and/or an air-entraining agent and/or a thickening agent and/or a retarder and/or a clay-inerting agent; with 140 to 220 $l/m^3$ of effective water, the total quantity of clinker in the wet concrete being less than or equal to 200 $kg/m^3$.

8 Claims, 2 Drawing Sheets

CONCRETE WITH A LOW CLINKER CONTENT

CROSS-REFERENCE TO RELATED APPLICATIONS

This is the U.S. National Stage of PCT/IB2008/003968, filed Sep. 24, 2008, which in turn claims priority to French Patent Application No. 0706703, filed Sep. 25, 2007, the entire contents of both applications are incorporated herein by reference in their entireties.

FIELD OF THE INVENTION

The invention relates to a concrete with a low clinker content, as well as processes for the preparation of such a concrete and compositions useful for the implementation of these processes.

TECHNICAL BACKGROUND

In the field of ordinary structural concretes, in particular concretes of the C25/30 type (that is for which the typical compressive strength 28 days after mixing, measured on a 16×32 cm cylinder is at least 25 MPa, according to the EN 206-1 standard), it is noted that the quantity of cement is typically from 260 to 360 kg per m$^3$ of concrete. Current European standards moreover do not provide for levels of cement less than 260 kg/m$^3$ for ordinary structural concretes.

Now, the processes for cement production, and more particularly its essential constituent, clinker, are responsible for high emissions of carbon dioxide. The production of grains of clinker in fact requires:

a) pre-heating and decarbonation of the raw meal, which is obtained by grinding the raw materials, which are, in particular, limestone and clay; and b) firing or clinkering the meal at a temperature of 1450-1550° C., followed by rapid cooling.

These two stages produce $CO_2$, on the one hand as a direct product of the decarbonation and on the other hand as a by-product of the combustion which is implemented in the firing stage in order to raise the temperature.

The emission level reaches approximately 560 kg of $CO_2$ per tonne of binder for a binder typically used to produce a C25/30 concrete, which contains 65% of clinker (on the basis of an average of 850 kg of $CO_2$ emitted per tonne of clinker), and this is even greater for an ultra-high performance concrete.

Now, the high emissions of carbon dioxide in standard processes for the production of cement and concrete compositions constitute a major environmental problem, and in the current context, are subject to high economic penalties.

A strong need therefore exists for a process capable of producing concrete with reduced associated emissions of carbon dioxide, the said concrete providing satisfactory mechanical properties, and in particular equivalent to those of existing currently, in view of its use in the construction industry. In particular, the desired typical compressive strength of the concrete should be greater than or equal to 25 MPa after 28 days, in conformity with the EN 206-1 Standard. On the other hand, the desired average compressive strength of the concrete should be greater than or equal to 4 MPa, preferably greater than or equal to 5 MPa, at 20° C. 16 hours after mixing, the measurement being done according to the EN 12390-3 Standard on cylindrical specimens, kept according to the EN 12390-2 Standard at 20° C.±2° C. and relative humidity greater than 95%. The desired wet concrete's rheological properties should also be satisfactory, that is in particular that the viscosity of the mixed mixture be low enough to allow easy handling, even 2 hours after mixing.

SUMMARY OF THE INVENTION

The aim of the invention is therefore to provide a dry binder premix comprising, in mass proportions:

Portland clinker in the form of grains having a Dv97 from 10 to 30 µm or having a Blaine specific surface greater than or equal to 5300 cm$^2$/g, preferably greater than or equal to 5500 cm$^2$/g, the minimum quantity of the said clinker in mass percentage being determined according to formula (I) for a clinker having a Dv97 from 10 to 30 µm, or according to formula (II) for a clinker having a Blaine specific surface greater than or equal to 5300 cm$^2$/g:

$$[26 \times \ln(Dv97_k)] - 43 \qquad \text{Formula (I)}$$

in which $Dv97_k$ is the DV97 of the clinker given in µm;

$$[-6.10^{-3} \times BSS_k] + 75 \qquad \text{Formula (II)}$$

in which $BSS_k$ is the Blaine specific surface given in cm$^2$/g;

slag, of which the minimum quantity in mass percentage is determined according to formula (III) in the case of a mixture with a clinker having a Dv97 from 10 to 30 µm, or according to formula (IV) in the case of a mixture with a clinker having a Blaine specific surface greater than or equal to 5300 cm$^2$/g:

$$[1000 \div BSS_S] \times [(-90 \times \ln(Dv97_k)) + 310] \qquad \text{Formula (III)}$$

in which $Dv97_k$ is the Dv97 of the clinker given in µm, $BSS_S$ is the Blaine specific surface of the slag given in cm$^2$/g;

$$[1000 \div BSS_S] \times [(0.021 \times BSS_k) - 103] \qquad \text{Formula (IV)}$$

in which $BSS_k$ and $BSS_S$ are respectively the Blaine specific surface of the clinker and the slag given in cm$^2$/g;

the total quantity of clinker in the binder premix being strictly less than 60%.

In both of formulae (I) and (III), <<ln>> means Napierian logarithm.

According to an embodiment, the dry binder premix according to the invention further comprises complementary materials having a Dv90 less than or equal to 200 µm.

According to an embodiment, the dry binder premix also comprises from 0.05 to 1.5%, preferably from 0.1 to 0.8%, by mass of a plasticizer, preferably of the polycarboxylate type.

According to an embodiment of the dry binder premix according to the invention, the clinker is in the form of grains having a Dv97 from 10 to 20 µm or a Blaine specific surface greater than or equal to 6500 cm$^2$/g, preferably greater than or equal to 8500 cm$^2$/g.

According to an embodiment, the complementary materials constitute an inert charge.

According to an embodiment of the dry binder premix according to the invention, the complementary materials are selected from fly ash, limestone powders, calcined shale, metakaolins, siliceous fillers, silica powders, pozzolans, slags, or clinker and mixtures thereof.

According to an embodiment, the dry binder premix further comprises an accelerator and/or an air-entraining agent and/or a thickening agent and/or a retarder and/or a clay inerting agent and/or a plasticizer.

The invention also provides a dry binder mix comprising, in volume proportions:

at least 10% of the above-mentioned dry binder premix; and up to 90% of aggregates.

According to an embodiment of the dry binder mix according to the invention, the aggregates comprise sand and gravel, the mass ratio of the quantity of sand to the quantity of gravel being from 1.5:1 to 1:1.8, preferably from 1.25:1 to 1:1.4, more preferably from 1.2:1 to 1:1.2.

The invention also provides a wet concrete composition, comprising from 140 to 220 l/m³ of effective water in association with:
- at least 10% by volume of the above-mentioned dry binder premix in its variant further comprising complementary materials; and
- up to 90% by volume of aggregates;

the percentages corresponding to proportions relative to the total dry volume.

According to an embodiment of the wet concrete composition according to the invention, the aggregates comprise sand and gravel, the mass ratio of the quantity of sand to the quantity of gravel being from 1.5:1 to 1:1.8, preferably from 1.25:1 to 1:1.4, more preferably from 1.2:1 to 1:1.2.

According to an embodiment of the wet concrete composition according to the invention, the quantity of effective water used varies from 140 to 200 l/m³, preferably from 150 to 180 l/m³ (see EN 206-1 Standard paragraph 3.1.30).

According to an embodiment, the wet concrete composition according to the invention is a threshold concrete.

According to an embodiment, the wet concrete composition according to the invention has an average compressive strength greater than 4 MPa, at 20° C. 16 hours after mixing, and a typical compressive strength greater than 25 MPa, 28 days after mixing.

According to an embodiment, the wet concrete composition according to the invention has a spread from 180 to 270 mm, preferably from 215 to 235 mm, using the ASTM C230 standard cone, after a period of 1 minute and 45 seconds, of which 30 seconds are in the presence of 50 Hz frequency and 0.5 mm amplitude.

According to an embodiment of the wet concrete composition according to the invention, the slump using the Abrams cone (or slump value) is from 0 to 250 mm, preferably from 100 to 240 mm.

The invention also provides a hardened concrete object of the above-mentioned composition.

The invention also provides a process for the preparation of a wet concrete composition comprising a stage of:
- mixing the above-mentioned mixture with 140 to 220 l/m³ of effective water; or
- mixing the pre-mix in its variant further comprising complementary materials, with aggregates and 140 to 220 l/m³ of effective water; or
- mixing the pre-mix in its variant not comprising complementary materials, with complementary materials, aggregates and 140 to 220 l/m³ of effective water.

According to a variant of the process for the preparation of a wet concrete composition according to the invention, the mixing is moreover done in the presence of calcium sulphate.

The invention also provides a process for the preparation of a wet concrete composition comprising a stage of mixing:
Portland clinker in the form of grains having a Dv97 from 10 to 30 μm or having a Blaine specific surface greater than or equal to 5300 cm²/g, preferably greater than or equal to 5500 cm²/g,
the minimum quantity of the said clinker in kg/m³ being determined according to formula (V) for a clinker having a Dv97 from 10 to 30 μm, or according to formula (VI) for a clinker having a Blaine specific surface greater than or equal to 5300 cm²/g:

$$[(90 \times \ln(Dv97_k)) - 150] \times (W_{\mathit{eff}} \div 140) \quad \text{Formula (V)}$$

in which $Dv97_k$ is the Dv97 of the clinker given in μm, $W_{\mathit{eff}}$ is the quantity of effective water in l/m³

$$[(-0.021 \times BSS_k) + 263] \times (W_{\mathit{eff}} \div 140) \quad \text{Formula (VI)}$$

in which $BSS_k$ is the Blaine specific surface of the clinker given in cm²/g,
$W_{\mathit{eff}}$ is the quantity of effective water in l/m³;

slag, of which the minimum quantity in kg/m³ is determined according to formula (VII) in the case of a mixture with a clinker having a Dv97 from 10 to 30 μm, or according to formula (VIII) in the case of a mixture with a clinker having a Blaine specific surface greater than or equal to 5300 cm²/g:

$$(3500 \div BSS_L) \times [-90 \times \ln(Dv97_k) + 310] \times (W_{\mathit{eff}} \div 140) \quad \text{Formula (VII)}$$

in which $Dv97_k$ is the Dv97 of the clinker and is given in μm,
$BSS_S$ is the Blaine specific surface of the slag given in cm²/g,
$W_{\mathit{eff}}$ is the quantity of effective water in l/m³;

$$(3500 \div BSS_S) \times [0.021 \times BSS_k - 103] \times (E_{\mathit{eff}} \div 140) \quad \text{Formula (VIII)}$$

in which $BSS_k$ and $BSS_S$ are respectively the Blaine specific surface of the clinker and the slag given in cm²/g,
$W_{\mathit{eff}}$ is the quantity of effective water in l/m³;

calcium sulphate;
complementary materials, having a Dv90 less than or equal to 200 μm, of which the minimum quantity in kg/m³ is determined according to the following formula (IX):

$$220 - (\text{quantity of slag}) - (\text{quantity of clinker}) - (\text{quantity of calcium sulphate}) \quad \text{Formula (IX);}$$

from 1500 to 2200 kg/m³, preferably from 1700 to 2000 kg/m³ of aggregates;
a plasticizer;
optionally an accelerator and/or an air-entraining agent and/or a thickening agent and/or a retarder and/or a clay inerting agent; with
140 to 220 l/m³ of effective water,
the total quantity of clinker in the wet concrete being less than or equal to 200 kg/m³.

In both of formulae (V) and (VII), <<ln>> means Napierian logarithm.

According to an embodiment of the process for the preparation of a wet concrete composition, the clinker and/or the slag and/or the complementary materials are as defined above in relation to the pre-mix.

According to an embodiment of the process for the preparation of a wet concrete composition, the quantity of effective water used varies from 140 to 200 l/m³, preferably from 150 to 180 l/m³.

The invention also provides a process for the preparation of a cast wet concrete, comprising a step of:
casting a wet concrete composition as defined above.

The invention also provides a process for the production of a concrete object, comprising a step of:
hardening of a wet concrete composition as defined above or a cast wet concrete composition as defined above.

The invention makes it possible to respond to the need to reduce $CO_2$ emissions hitherto unsatisfied by known concretes. Indeed, the quantity of cement (and in particular of clinker) used within the scope of this invention is less than that which is conventionally necessary. More precisely, the induced emission of $CO_2$ is reduced by the order of 50 to 60% compared to a standard C25/30 type of concrete, while not leading to any significant reduction in the mechanical performance of the concrete, as the invention provides a concrete with a typical compressive strength greater than or equal to 25 MPa 28 days after mixing and a form removal time of the order of 16 hours at 20° C. Moreover, the rheology of wet concrete compositions remains of the same order as those of compositions of standard concretes. Furthermore, the invention makes it possible, despite a very low level of clinker, to retain early-age strengths of the same order of magnitude as those obtained using a formulation with a standard content of clinker.

The concrete obtained according to the invention also has the following advantages:
- the cost of the dry binder premixes according to the invention can be typically less by 7 to 10% than the cost of dry binder premixes used to prepare a standard C25/30 concrete.

The various specific aims and advantages and embodiments of the invention can be obtained by means of full optimisation of all the formulation parameters, and in particular by means of:
- optimisation of the particle packing of the various materials (allowing for a minimisation of the quantity of water for a given rheological behaviour);
- optimisation of the mixture's topology, that is the multiplication and the homogeneity in space of the adhesion interfaces between particles of sand and/or aggregates by <<glue points>> of cement hydrates (in particular via the use of clinker grains approximately 2 to 5 times finer than those of ordinary Portland cement);
- the search for a <<chrono-formulation>>, that is, the utilisation of a minimum quantity of clinker to ensure the acquisition of short-term mechanical strength, while other binding materials are present in a quantity adjusted to provide the more long-term acquisition of mechanical strength (acting to a certain extent as a relay for the clinker in the increase of mechanical strength);
- adjustment of the total water demand by a choice of materials with a relatively low total water demand (in particular low porosity), which also makes it possible to maximise compressive strength;
- optimisation of the various admixtures and in particular the plasticizer (superplasticizer), which makes it possible to maximise the reduction of effective water by optimisation of the dispersion of the powder and hence the packing.

BRIEF DESCRIPTION OF THE FIGURES

FIG. 4 represents the granulometric profile of the aggregates used in the examples below. The size in mm is represented on the x axis and the cumulative volume percentage is represented on the y axis. Curve n°1 represents Honfleur 0/4R sand (alluvial river sand), curve n°2 represents Cassis 0/3.15 sand (crushed sand), curve n°3 represents Cassis 6.3/10 aggregate (crushed gravel), curve n°4 represents St Bonnet 0/5R aggregate (see example 4).

DESCRIPTION OF THE EMBODIMENTS OF THE INVENTION

The invention is now described in more detail and in a non-restrictive manner in the following description.

Clinker

<<Clinker>> is to be understood according to the present invention as a Portland clinker as defined in the EN 197-1 Standard, paragraph 5.2.1.

The Portland clinker according to the invention can be obtained from standard Portland cements, and in particular from the cements described in the EN 197-1 European Standard. It is possible for example to use a CEM I or CEM II 52.5 N or R or PM (marine construction, NF P 15-317 Standard) cement or PMES cement (marine construction, sulphated water, NF P 15-319 Standard). The cement can be of the HRI type (High Initial Strength).

In certain cases, in particular for the CEM II type, Portland cement does not comprise pure clinker. The CEM II type of Portland cement comprises clinker mixed with at least one additional material (slag, silica fume, pozzolan, fly ash, calcined shale, limestone . . . ) in a quantity up to 37% by mass. Therefore, if the clinker used comes from such a cement, the additional material(s) are counted either among the slag, or among the above-mentioned "complementary materials" (if they are materials in the form of grains with a Dv90 less than or equal to 200 µm, and preferably a Dv97 less than or equal to 200 µm).

Such a cement must be ground and/or cut (by pneumatic classification) in order to provide clinker with the characteristics required in the invention, that is a Dv97 from 10 to 30 µm, preferably from 10 to 20 µm, or with a Blaine specific surface greater than or equal to 5300 $cm^2/g$, preferably greater than or equal to 5500 $cm^2/g$ according to the EN 196-6 Standard, paragraph 4.

According to a variant of the invention, the clinker has a Dv97 from 10 to 30 µm and a Blaine specific surface greater than or equal to 5300 $cm^2/g$, preferably greater than or equal to 5500 $cm^2/g$.

According to another variant of the invention, the clinker has a Dv97 from 10 to 30 µm and/or a Blaine specific surface greater than or equal to 5300 $cm^2/g$, preferably greater than or equal to 5500 $cm^2/g$.

According to a third variant of the invention, the clinker has a Blaine specific surface greater than or equal to 5300 $cm^2/g$, preferably greater than or equal to 5500 $cm^2/g$.

According to a fourth variant of the invention, the clinker has a Dv97 from 10 to 30 µm.

The clinker according to the invention can be described as ultrafine clinker. The cement can for example be ground using a grinding plant comprising a primary grinder of the grinding or vertical type coupled with a finishing mill of the Horomill©, pendular, or ball mill or air-jet mill type. It is also possible to use a second, third generation or a very-high-efficiency pneumatic selector or classifier.

The intention is, by reducing the size of the clinker, to maximise the diffusion distances of the grains of cement so as to maximise the homogeneity of the matrix by means of an optimum distribution of the inter-particle glue points.

The Dv97 (by volume) corresponds to the 97$^{th}$ percentile of the particle size distribution, that is that 97% of the particles have a size smaller than the Dv97 and 3% have a size larger than the Dv97. Likewise, the Dv90 corresponds to the 90$^{th}$ percentile of the particle size distribution, that is that 90% of the particles have a size smaller than the Dv90 and 10% have a size larger than the Dv90.

Generally, the Dv90, the Dv97 and other values of the same type, which are characteristic of the granulometric profile (volume distribution) of a collection of particles or grains can be determined by laser granulometry for particle sizes less than 200 μm, or by sieving for particle sizes greater than 200 μm.

Nevertheless, when individual particles have a tendency to aggregate, it is necessary to determine their size by electron microscopy, given that the apparent measured size by laser diffraction granulometry is more important than the real particle size, which is liable to falsify the interpretation (agglomeration and flocculation).

It can be preferable to use a cement with a high content of soluble alkalis. This allows for example activation of the slag component.

Slag

The term <<Slag>> is to be understood according to the present invention as a blast furnace slag according to the EN 197-1 Standard, paragraph 5.2.2 with a glass content of 80% minimum, ground to a minimum fineness (Blaine specific surface, Standardized method EN 196-6) of 2500 cm$^2$/g.

The slags according to the invention can be used alone or in combination with one another. The person skilled in the art will select the appropriate slags according to their reactivity, that is their ability to promote compressive strength from 1 day to 28 days after mixing. This ability varies according to the type and specific provenance of the slags used.

Complementary Materials

<<Complementary materials>> are to be understood as materials in the form of grains with a Dv90 less than or equal to 200 μm, preferably a Dv97 less than or equal to 200 μm.

These materials can serve as filling materials for the matrix, that is, they fill in the gaps between the other materials having grains larger in size.

Even though it is possible to envisage that the complementary materials can be binder materials, optimisation (in particular in terms of cost) for concretes according to the invention leads to a preference for the complementary materials to be an inert charge, that is non-binding materials (without hydraulic or pozzolanic activity).

It will be possible for example to use as complementary materials limestone powders (limestone fillers) or fly ash or mixtures thereof. It will also be possible to use calcined shale, metakaolins, siliceous fillers, silica powders, pozzolans (see the EN197-1 Standard, paragraph 5.2.3), slags, or again a different clinker to the clinker according to the invention.

Calcium Sulphate

<<Calcium sulphate>> is to be understood according to the present invention as any material allowing the provision of sulphate (SO$_3$) to the binder, as defined in the EN 197-1 Standard, paragraph 5.4.

Calcium sulphate according to the invention can in particular be selected from gypsum, hemihydrate, anhydrite or mixtures thereof. Calcium sulphate can exist in the natural state or can come from industry in the form of a by-product of certain industrial processes.

The quantity of calcium sulphate according to the invention is adjusted in a conventional manner in order to be at the optimum mechanical compressive strength after 24 hours and at 20° C. Preferably, the quantity of calcium sulphate according to the invention, determined according to the method described in the EN 196-2 Standard, paragraph 8, is from 2.0 to 3.5%, in mass percentage of sulphate (SO$_3$) relative to the mass of the mixture (clinker+slag+complementary material+calcium sulphate).

Water

Concrete comprises different categories of water. First of all, the effective water is the concrete's internal water, located between the grains of the solid skeleton formed by the aggregates, the clinker, the slag and the complementary materials. The effective water therefore represents the water necessary for hydration and to obtain consistency. On the other hand, concrete comprises water retained by the porosity of the aggregates, the slag and the complementary materials. This water is not taken into account in the effective water. It is assumed to be imprisoned and does not participate in the hydration of the cement or to obtain consistency. The total water represents all the water in the mixture (at the time of mixing).

Dry Binder Pre-Mixes

The dry binder pre-mix according to the invention comprises in mass proportions:

Portland clinker in the form of grains with a Dv97 from 10 to 30 μm or with a Blaine specific surface greater than or equal to 5300 cm$^2$/g, preferably greater than or equal to 5500 cm$^2$/g, the minimum quantity of the said clinker in mass percentage being determined according to formula (I) for a clinker with a Dv97 from 10 to 30 μm, or according to formula (II) for a clinker with a Blaine specific surface greater than or equal to 5300 cm$^2$/g:

$$[26 \times \ln(Dv97_k)] - 43 \qquad \text{Formula (I)}$$

in which $Dv97_k$ is given in μm $$[-6.10^{-3} \times BSS_k] + 75 \qquad \text{Formula (II)}$$

in which $BSS_k$ is the Blaine specific surface of the clinker given in cm$^2$/g;

slag, of which the minimum quantity in mass percentage is determined according to formula (III) in the case of a clinker with a Dv97 from 10 to 30 μm, or according to formula (IV) in the case of a mixture with a clinker with a Blaine specific surface greater than or equal to 5300 cm$^2$/g:

$$[1000 \div BSS_S] \times [(-90 \times \ln(Dv97_k)) + 310] \qquad \text{Formula (III)}$$

in which $Dv97_k$ is the Dv97 of the clinker given in μm, $BSS_S$ is the Blaine specific surface of the slag given in cm$^2$/g;

$$[1000 \div BSS_S] \times [(0.021 \times BSS_k) - 103] \qquad \text{Formula (IV)}$$

in which $BSS_k$ and $BSS_S$ are respectively the Blaine specific surface of the clinker and the slag given in cm$^2$/g;

the total quantity of clinker in the binder pre-mix being strictly less than 60%.

Preferably, the minimum quantity of the said clinker in mass percentage is determined according to formula (I bis) for a clinker with a Dv97 from 10 to 30 μm, or according to formula (II bis) for a clinker with a Blaine specific surface greater than or equal to 5300 cm$^2$/g:

$$[26 \times \ln(Dv97_k)] - 37 \qquad \text{Formula (I bis)}$$

in which $Dv97_k$ is given in μm $$[-6.10^{-3} \times BSS_k] + 81 \qquad \text{Formula (II bis)}$$

in which $BSS_k$ is the Blaine specific surface of the clinker given in cm$^2$/g;
and the minimum quantity of slag in mass percentage is determined according to formula (III bis) in the case of a clinker with a Dv97 from 10 to 30 μm, or according to formula (IV bis) in the case of a mixture with a clinker with a Blaine specific surface greater than or equal to 5300 cm$^2$/g:

$$[1000 \div BSS_S] \times [(-90 \times \ln(Dv97_k)) + 330] \qquad \text{Formula (III bis)}$$

in which $Dv97_k$ is the Dv97 of the clinker given in μm,
$BSS_S$ is the Blaine specific surface of the slag given in cm$^2$/g;

$$[1000 \div BSS_S] \times [(0.021 \times BSS_k) - 83] \qquad \text{Formula (IV bis)}$$

in which $BSS_k$ and $BSS_S$ are respectively the Blaine specific surface of the clinker and the slag given in cm$^2$/g.

In both formulae (I bis) and (III bis), <<ln>> means a Napierian logarithm.

Preferably, the dry binder premix according to the invention, further comprises complementary materials with a Dv90 less than or equal to 200 μm.

Preferably, the dry binder premix according to the invention, further comprises calcium sulphate.

The clinker, the slag and the complementary materials can be advantageously combined according to the proportions given above to form dry binder premixes (free of added water) intended to be mixed with aggregates and water.

The following dry binder premixes according to the invention are particularly advantageous:
  clinker, slag and limestone powder;
  clinker, slag and fly ash;

Advantageously, one or more admixtures typically used in the art may also be envisaged in these dry binder premixes: an accelerator and/or and air-entraining agent and/or a thickening agent and/or a retarder and/or a clay inerting agent and/or a plasticizer. In particular, it is useful to include a plasticizer (superplasticizer) in particular of the polycarboxylate type, in particular from 0.05 to 1.5%, preferably from 0.1 to 0.8%, mass percentage.

<<Clay-inerting agent>> is to be understood as all molecules capable of reducing or cancelling the detrimental effect of clays on the properties of hydraulic binders. It is possible to use, in particular clay-inerting agents such as those described in the International Patent Applications WO 2006/032785 and WO 2006/032786 documents.

Aggregates

The definition of aggregates according to the invention is that of the XPP18-545 Standard, given that the aggregates according to the invention have a maximum Dmax size less than or equal to 32 mm. The aggregates according to the invention comprise sand (grains with a maximum Dmax size less than 4 mm, defined as passing through a sieve, EN 12620 Standard, paragraph 3.8), and/or gravel (grains or pebbles with a minimum Dmin size greater than 4 mm, defined as sieve retention, EN 12620 Standard, paragraph 3.9).

The aggregates can be of a limestone, siliceous or silica-limestone nature.

The sand and gravel may be river and/or crushed. A crushed sand comprises a greater proportion of fines than a river sand.

According to the vocabulary used in the field of sand, fines are grains with a size less than 63 μm (passing through a sieve).

When the sand comprises fines in a quantity in excess of 1% (mass fraction of the sand), it is necessary to take into account the quantity of fines supplied by the sand, by reducing the quantity of <<complementary materials>> described above by a quantity equal to the quantity of fines present in the sand (fraction less than 63 μm) beyond a threshold of 1%.

Preferably, the clay content of the sand and the aggregates is less than 1%. High clay contents have a negative effect on concrete workability.

Preferably the mass ratio of the quantity of sand to the quantity of gravel is from 1.5:1 to 1:1.8, more particularly from 1.25:1 to 1:1.4, in particular from 1.2:1 to 1:1.2, and ideally is equal or close to 1:1.

Dry Binder Mixes

The aggregates, the clinker, the slag, the complementary materials, the optional admixtures (in particular plasticizing agent) may be combined in dry binder mixes (free of added water). Such dry binder mixes can be prepared either by mixing an above-defined dry binder premix with the aggregates, or by mixing directly the different constituents ab initio.

The volume proportions of the different constituents can then be defined as follows:
  at least 10% of the above-mentioned dry binder premix; and
  up to 90% of aggregates.

Preferably, the dry binder mix according to the invention comprises complementary materials.

Preferably, the dry binder mix according to the invention further comprises calcium sulphate.

A dry binder mix thus defined can be a dry ready-mix concrete, usable by simply mixing with water.

According to a variant of the dry binder mix according to the invention, the volume proportions of the different constituents can be defined as follows:
  at least 10% of the above-mentioned dry binder premix; and
  up to 90% of gravel.

Preferably, the dry binder mix according to the invention further comprises calcium sulphate.

According to a variant of the dry binder mix according to the invention, the volume proportions of the different constituents can be defined as follows:
  at least 10% of the above-mentioned dry binder premix; and
  up to 90% of sand.

Preferably, the dry binder mix according to the invention further comprises calcium sulphate.

Concrete

The term <<wet concrete>> according to the invention is to be understood as fresh concrete (see the EN 206-1 standard, paragraph 3.1.2).

The wet concrete according to the invention is prepared by mixing:
  at least 10% by volume of the dry binder premix in its variant further comprising complementary materials; and
  up to 90% by volume of aggregates;
  with 140 to 220 l/m$^3$ of effective water.

The percentages correspond to proportions relative to the total dry volume.

Preferably the wet concrete according to the invention further comprises calcium sulphate.

The wet concrete can also be prepared directly by mixing the above-defined dry mix with 140 to 220 l/m³ of effective water.

The concrete according to the invention can also be prepared by mixing directly the different ingredients together and with the water. The process for the preparation of a wet concrete composition according to the invention comprises a step of mixing:

Portland clinker in the form of grains having a Dv97 from 10 to 30 µm or having a Blaine specific surface greater than or equal to 5300 cm²/g, preferably greater than or equal to 5500 cm²/g, the minimum quantity of the said clinker in kg/m³ being determined according to formula (V) for a clinker having a Dv97 from 10 to 30 µm, or according to formula (VI) for a clinker having a Blaine specific surface greater than or equal to 5300 cm²/g:

$$[(90 \times \ln(Dv97_k)) - 150] \times (W_{eff} \div 140) \quad \text{Formula (V)}$$

in which $Dv97_k$ is the Dv97 of the clinker given in µm, $W_{eff}$ is the quantity of effective water in l/m³

$$[(-0.021 \times BSS_k) + 263] \times (W_{eff} \div 140) \quad \text{Formula (VI)}$$

in which $BSS_k$ is the Blaine specific surface of the clinker given in cm²/g,
$W_{eff}$ is the quantity of effective water in l/m³;

slag, the minimum quantity of which in kg/m³ is determined according to formula (VII) in the case of a mixture with clinker having a Dv97 from 10 to 30 µm, or according to formula (VIII) in the case of a mixture with a clinker having a Blaine specific surface greater than or equal to 5300 cm²/g:

$$(3500 \div BSS_S) \times [-90 \times \ln(Dv97_k) + 310] \times (W_{eff} \div 140) \quad \text{Formula (VII)}$$

in which $Dv97_k$ is the Dv97 of the clinker given in µm, $BSS_S$ is the Blaine specific surface of the slag given in cm²/g,
$W_{eff}$ is the quantity of effective water in l/m³;

$$(3500 \div BSS_S) \times [0.021 \times BSS_k - 103] \times (W_{eff} \div 140) \quad \text{Formula (VIII)}$$

in which $BSS_k$ and $BSS_S$ are respectively the Blaine specific surface of the clinker and the slag given in cm²/g,
$W_{eff}$ is the quantity of effective water in l/m³;

calcium sulphate;

complementary materials, having a Dv90 less than or equal to 200 µm, the minimum quantity of which in kg/m³ is determined according to the following formula (IX):

$$220 - (\text{quantity of slag}) - (\text{quantity of clinker}) - (\text{quantity of calcium sulphate}) \quad \text{Formula (IX)};$$

from 1500 to 2200 kg/m³, preferably from 1700 to 2000 kg/m³ of aggregates;

a plasticizer;

optionally an accelerator and/or an air-entraining agent and/or a thickening agent and/or a retarder and/or a clay inerting agent; with 140 to 220 l/m³ of effective water, the total quantity of clinker in the wet concrete being less than or equal to 200 kg/m3.

<<kg/m³>> is to be understood as the mass of material to be used per m³ of concrete produced.

Preferably the minimum quantity of the said clinker in kg/m³ is determined according to formula (V bis) for a clinker with a Dv97 from 10 to 30 µm, or according to formula (VI bis) for a clinker with a Blaine specific surface greater than or equal to 5300 cm²/g:

$$[(90 \times \ln(Dv97_k)) - 130] \times (W_{eff} \div 140) \quad \text{Formula (V bis)}$$

in which $Dv97_k$ is the Dv97 of the clinker given in µm, $W_{eff}$ is the quantity of effective water in l/m³;

$$[(-0.021 \times BSS_k) + 283] \times (W_{eff} \div 140) \quad \text{Formula (VI bis)}$$

in which $BSS_k$ is the Blaine specific surface of the clinker given in cm²/g,
$W_{eff}$ is the quantity of effective water in l/m³;

and the minimum quantity of slag in kg/m³ is determined according to formula (VII bis) in the case of a mixture with a clinker with a Dv97 from 10 to 30 µm, or according to formula (VIII bis) in the case of a mixture with a clinker with a Blaine specific surface greater than or equal to 5300 cm²/g:

$$(3500 \div BSS_S) \times [-90 \times \ln(Dv97_k) + 330] \times (W_{eff} \div 140) \quad \text{Formula (VII bis)}$$

in which $Dv97_k$ is the Dv97 of the clinker given in µm, $BSS_S$ is the Blaine specific surface of the slag given in cm²/g,
$W_{eff}$ is the quantity of effective water in l/m³;

$$(3500 \div BSS_S) \times [0.021 \times BSS_k - 83] \times (W_{eff} \div 140) \quad \text{Formula (VIII bis)}$$

in which $BSS_k$ and $BSS_S$ are respectively the Blaine specific surface of the clinker and the slag given in cm²/g,
$W_{eff}$ is the quantity of effective water in l/m³.

In both formulae (V bis) and (VII bis), <<ln>> means Napierian logarithm.

The quantity of the said clinker used is preferably less than 180 kg/m3, advantageously less than 150 kg/m³, preferably less than 120 kg/m³.

Preferably the minimum quantity of complementary materials in kg/m³ is determined according to the following formula (IX bis):

$$250 - (\text{quantity of slag}) - (\text{quantity of clinker}) - (\text{quantity of calcium sulphate}) \quad \text{Formula (IX bis)}$$

According to an embodiment of the process for the preparation of the wet concrete according to the invention, the quantity of effective water used varies from 140 to 200 l/m³, preferably from 150 to 180 l/m³. According to certain embodiments, this quantity of effective water is therefore reduced relative to a standard concrete.

Preferably the aggregates comprise sand and gravel and the mass ratio of the quantity of sand to the quantity of gravel is from 1.5:1 to 1:1.8, more particularly from 1.25:1 to 1:1.4, in particular from 1.2:1 to 1:1.2, and ideally equal or close to 1:1.

The materials in question have, according to particular embodiments, the same characteristics as those described above relative to the binder mixes and premixes according to the invention.

The mixing is done using a conventional mixer at a concrete mixing plant or directly in a drum-truck mixer, for a mixing time usual in the field.

The wet concrete compositions obtained according to the invention have comparable mechanical properties, preferably at least as good, or even better than, standard C25/30 types of concretes, in particular in terms of compressive strength after 16 hours and after 28 days and in terms of rheology.

In particular, according to an embodiment of the invention, the average compressive strength is greater than or equal to 4 MPa, preferably greater than or equal to 5 MPa, at 20° C. 16 hours after mixing, and greater than or equal to 25 MPa, preferably greater than or equal to 28 MPa, 28 days after mixing.

According to an embodiment of the wet concrete according to the invention, the slump using the Abrams cone (or slump value) is from 0 to 250 mm, preferably from 100 to 240 mm, the measurement being done according to the EN 12350-2 European Standard, of December 1999.

According to an embodiment of the wet concrete according to the invention, the spread after one minute is from 50 to 140 mm, preferably from 85 to 105 mm using the ASTM C230 Standard cone in the absence of vibrations.

According to an embodiment of the wet concrete according to the invention, the spread after one minute is from 180 to 270 mm, preferably from 215 to 235 mm using the ASTM C230 Standard cone in the presence of vibrations, the measurement being done as indicated in example 6 below.

Hence the concretes according to the invention have equivalent rheological properties to standard C25/30 concretes.

Preferably, the concretes according to the invention are threshold concretes. <<Threshold concrete>> is understood to be a concrete (wet) which requires the supply of positive energy (for example a shear force, a vibration or a shock) in order to trigger its flow. In contrast, a non-threshold concrete flows by itself, without supply of external energy. Thus a threshold concrete behaves essentially, below an energy threshold, like a deformable elastic solid; and above this energy threshold, like a viscous fluid.

The quantity of clinker used to prepare the concrete according to the invention is very much less than what is necessary to prepare a standard C25/30 concrete, which provides a means of making spectacular savings in terms of $CO_2$ emissions. Compared to a reference C25/30 formula which contains 95 $kg/m^3$ of limestone and 260 $kg/m^3$ of cement, a concrete according to the invention comprising for example from 100 to 120 $kg/m^3$ of clinker provides a saving of $CO_2$ emissions of the order of 50 to 60%.

The concrete according to the invention may be cast according to ordinary methods; after hydration/hardening, hardened concrete objects such as construction elements, structural elements or others are obtained.

EXAMPLES

The following examples illustrate the invention without limiting it.

Example 1

Laser Granulometry Method

The granulometry curves of the different powders are obtained using a Malvern MS2000 laser granulometer. The measurement is carried out by the wet method (aqueous medium); the size of the particles must be from 0.02 µm to 2 mm. The light source is provided by a red He—Ne laser (632 nm) and a blue diode (466 nm). The optical model is that of Fraunhofer, the calculation matrix is of the polydisperse type.

A measurement of the background noise is first carried out at a pump speed of 2000 rpm, a stirrer speed of 800 rpm and a noise measurement for 10 s, in the absence of ultrasound. During the calibration/blank measurement phase of the apparatus, the light intensity of the laser is verified to be at least equal to 80%, and that a decreasing exponential curve for the background noise is obtained. Otherwise, the cell lenses must be cleaned.

A first measurement is then carried out on the sample with the following parameters: pump speed: 2000 rpm, stirrer speed: 800 rpm, absence of ultrasound. The sample is introduced so as to have an obscuration from 10 to 20%. <<Obscuration>> is to be understood as the extinction of the laser signal by the suspension circulating between the emitter and the central sensor (turbidimeter). 100% obscuration corresponds to complete extinction of the signal. In contrast, 0% obscuration corresponds to pure translucent fluid without any particles. The obscuration depends on the concentration of solids in the suspension and the refractive index of the particles. After stabilization of the obscuration, measurement is carried out with a fixed period between immersion and measurement set at 10 s. The duration of the measurement is 30 s (30000 diffraction images analyzed). In the granulogram obtained the fact that part of the population of the powder may be agglomerated should be taken into account.

A second measurement is then carried out (without emptying the tank) with ultrasound. The pump speed is brought to 2500 rpm, stirring to 1000 rpm, the ultrasound is emitted at 100% (30 watts). These conditions are maintained for 3 minutes, then the initial parameters are restored: pump speed of 2000 rpm, stirrer speed of 800 rpm, absence of ultrasound. At the end of 10 s (to remove any possible air bubbles), a measurement is made for 30 s (30000 images analyzed). This second measurement corresponds to a de-agglomerated powder by ultrasonic dispersion.

Each measurement is repeated at least twice to verify the stability of the result. The apparatus is calibrated before each work session by means of a standard sample (Sifraco C10 silica) for which the granulometric curve is known. All the measurements given in the description and the indicated ranges correspond to values obtained with ultrasound.

Example 2

Method for Measurement of the Specific Surface

BET Specific Surface:

The specific surface of different powders is measured as follows. A sample of powder is taken of the following mass: 0.1 to 0.2 g for an estimated specific surface of more than 30 $m^2/g$; 0.3 g for an estimated 10-30 $m^2/g$ specific surface; 1 g for an estimated 3-10 $m^2/g$ specific surface; 1.5 g for an estimated 2-3 $m^2/g$ specific surface; 2 g for an estimated 1.5-2 $m^2/g$ specific surface; 3 g for an estimated 1-1.5 $m^2/g$ specific surface.

A 3 $cm^3$ or a 9 $cm^3$ cell is used depending on the volume of the sample. The measurement cell assembly (cell+glass rod) is weighed. Then the sample is added to the cell: the product must not be less than one millimeter from the top of the neck of the cell. The assembly is weighed (cell+glass rod+sample). The measurement cell is placed on a degassing unit and the sample is degassed. Degassing parameters are 30 min/45° C. for Portland cement, gypsum, pozzolans; 3 hours/200° C. for slags, silica fumes, fly ash aluminous cement, limestone; and 4 hours/300° C. for control alumina. The cell is rapidly closed with a stopper after degassing. The assembly is weighed and the result noted. All the weighing is carried out without the stopper. The mass of the sample is obtained by subtracting the mass of the cell from the mass of the cell+degassed sample.

The analysis of the sample is then carried out after placing it on the measurement unit. The analyzer is the Beckman Coulter SA 3100. The measurement is based on the adsorption of nitrogen by the sample at a given temperature, in this case the temperature of liquid nitrogen, that is −196° C. The apparatus measures the pressure of the reference cell in which the adsorbate is at its saturated vapour pressure and that of the sample cell in which known volumes of adsorbate are injected. The resulting curve of these measurements is the adsorption isotherm. In the measurement process it is necessary to know the dead space of the cell: a measurement of this volume is therefore carried out with helium before the analysis.

The mass of the sample, calculated beforehand is entered as a parameter. The BET surface is determined by the software by linear regression from the experimental curve. The standard deviation on reproducibility obtained from 10 measurements on a silica with a specific surface of 21.4 m²/g is 0.07. The standard deviation on reproducibility obtained from 10 measurements on a cement with a specific surface of 0.9 m²/g is 0.02. A control is carried out once every two weeks on a reference product. Twice a year a control is carried out with reference alumina provided by the manufacturer.

Blaine Specific Surface:

This is determined according to the EN 196-6 Standard, paragraph 4.

Example 3

The Raw Materials

The following materials are more particularly used in the following.

Cement: CPA CEM I 52.5 cement is used (from Lafarge Cements—Saint-Pierre la Cour cement plant, referred to as <<SPLC>>). Two methods are used to make it: selection and micronisation.

Selection is carried out using an Alpine Hosokawa AFG100 separator. Following this method produces a quality of cement: <<selected SPLC dv97=16 μm>> cement (turbine speed: 13000 revolutions per minute, 42.95% recovered material);

Micronisation was carried out using an Alpine Hosokawa AFG200 opposed air-jet mill. The rotation speed of the turbine was set in order to obtain a dv97 of 15 μm. This micronised cement will now be referred to as: <<micronised SPLC dv97=15 μm>>.

Figure 1:
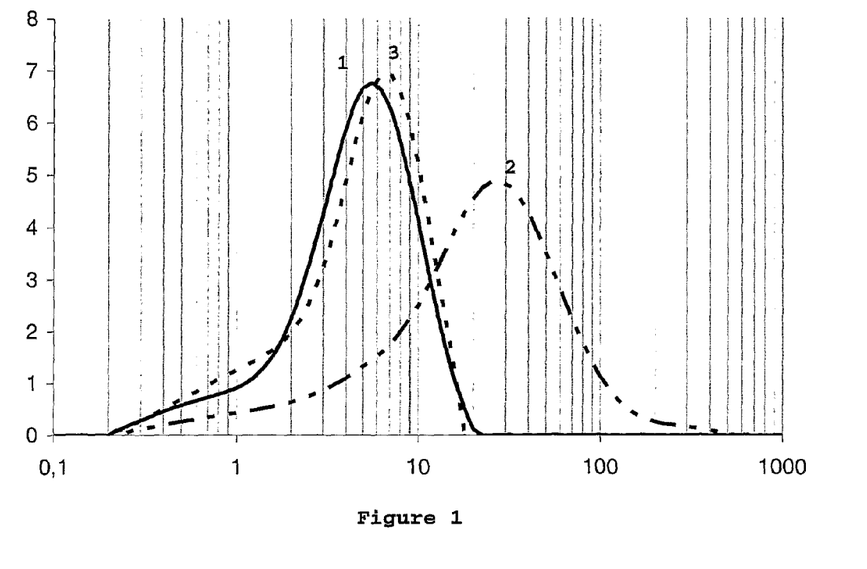
FIG. 1 represents the granulometric profile of the cement used in the examples below. The size in µm is shown on the x axis and the volume percentage is shown on the y axis. Curve n°1 corresponds to <<selected SPLC dv97=16 µm>> cement, curve n°2 corresponds to CEM I 52.5 HTS Le Teil cement and curve n°3 corresponds to <<micronised SPLC dv97=15 µm>> cement (see example 4).

The granulometric profile of these two cement qualities is shown in FIG. 1. This cement is obtained from a basic mixture with 95% of clinker, 2% of limestone and 3% of filler, to which is added 5% of gypsum or anhydrite and optionally grinding agents and/or chromium VI reducers. Thus, the cement comprises at least 90% of clinker.

The HTS CEM I 52.5 PMES cement from Le Teil (supplied by Lafarge) is used for the reference concrete (reference C25/30).

Figure 3:
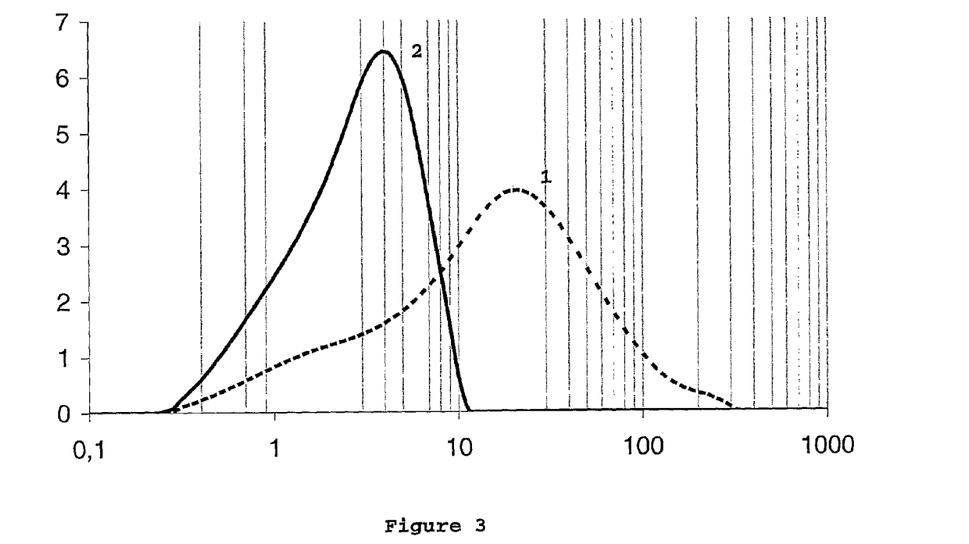
FIG. 3 represents the granulometric profile of the slags used in the examples below. The size in µm is represented on the x axis and the volume percentage is represented on the y axis. Curve n°1 represents the industrially ground Fos/Mer slag with a Blaine surface of 3260 $cm^2/g$. Curve n°2 represents the same slag micronised to a Blaine surface of 9150 $cm^2/g$ (see example 4).

The slag comes from Fos sur Mer. It is industrially ground. Two finenesses are used: 3260 and 3500 cm²/g (Blaine Surface). A sample of slag of 3260 cm²/g Blaine surface was micronised to a Blaine surface of 9150 cm²/g using an Alpine Hosokawa AFG200 opposed air-jet mill. The names of the different batches of slag refer to the Blaine surfaces as follows:

<<Slag 3500 cm²/g>>;
<<Slag 3260 cm²/g>>;
<<Micronized slag 9150 cm²/g>>;

The granulometric profiles of the slags of 3260 cm²/g and 9150 cm²/g Blaine surface are shown in FIG. 3.

Complementary materials: limestone fillers in the following list are used.

Calgar 40 (Provengale SA) with a BET specific surface of 0.99 m²/g and a methylene blue value, $MB_F$ of 0.6 g/100 g according to the NF EN 933-9 standard;

Mikhart 15 (supplier Provencale SA) with a BET specific surface of 1.2 m²/g and a methylene blue value, $MB_F$ of 0.27 g/100 g according to the NF EN 933-9 standard;

BL200 (supplier Omya) with a BET specific surface of 0.86 m²/g and a methylene blue value, $MB_F$ of 0.3 g/100 g according to the NF EN 933-9 standard;

Calgar FV (Provencale SA) with a BET specific surface of 1.08 m²/g and a methylene blue value, $MB_F$ of 0.3 g/100 g according to the NF EN 933-9 Standard.

Figure 2:
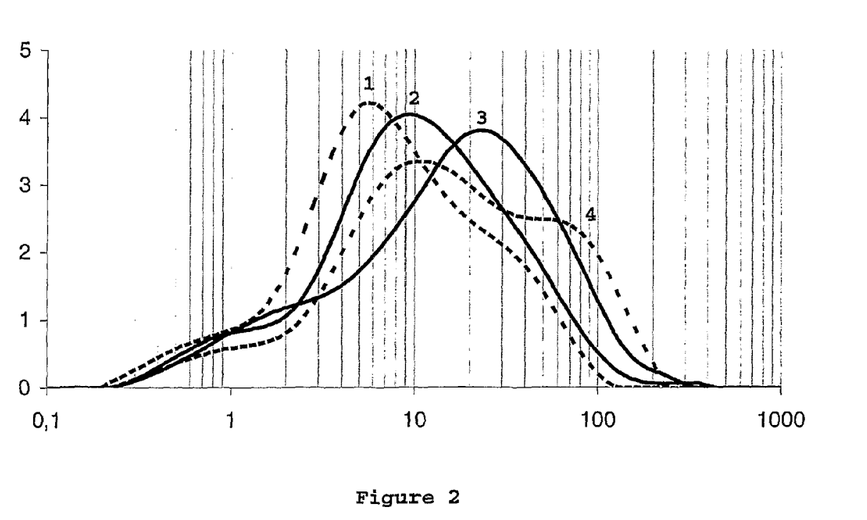
FIG. 2 represents the granulometric profile of the limestone fillers used in the examples below. The size in µm is represented on the x axis and the volume percentage is represented on the y axis. Curve n°1 represents the BL200 filler, curve n°2 represents the Calgar FV filler, curve n°3 represents the Mikhart 15 filler and curve n°4 represents the Calgar 40 filler (see example 4).

The granulometric profile of these materials is shown in FIG. 2.

Admixture:

The products used in the examples are the following:

Superplasticizer <<Optima 203>> from Chryso, which is of the polycarboxylate type;

Plasticizer <<Chrysoplast 209>> from Chryso, which is of the lignosulfonate type;

Superplasticizer <<Premia 180>> from Chryso, which is of the polycarboxylate type;

Plasticizer <<Optima 100>> from Chryso, which is of the polyphosphonate type;

Plasticizer <<Omega 101>> from Chryso, which is of the polycarboxylate type;

Anti-foaming agent <<TBP>>, with a Tributylphosphate base.

Aggregates: the materials in the following list are used:

Cassis Sand 0/3.15 (crushed sand);
Honfleur sand 0/4R (alluvial river sand);
St Bonnet Sand 0/5R (alluvial river sand);
Cassis Aggregates 6.3/10 (crushed gravel).

Figure 4:
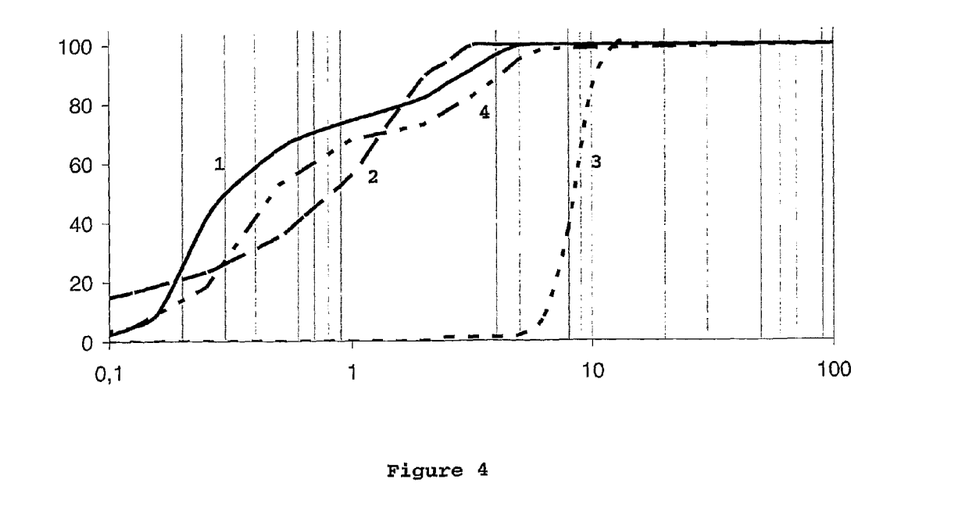

The granulometric profile of these materials is shown in FIG. 4.

Example 4

Concrete Formulations According to the Invention

The formulae which follow are formulae of concrete compositions according to the invention, except for the C25/30 formula, which is a control. The materials used are those described in example 3. Each number corresponds to the mass of material used (in kg) to prepare 1 m³ of concrete.

| Formula G3-1 | |
|---|---|
| Cassis aggregates 6.3/10 | 941.5 |
| Honfleur Sand 0/4R | 941.5 |
| Selected SPLC Cement dv97 = 16 μm | 100 |
| BL200 Filler | 218.8 |
| Slag 3500 cm²/g | 60 |
| Optima 203 admixture | 2.3 |
| Total water | 164.2 |
| Effective water | 142 |

| Formula G3-2 | |
|---|---|
| Cassis aggregates 6.3/10 | 941.5 |
| Cassis sand 0/3.15 | 941.5 |
| Selected SPLC Cement dv97 = 16 μm | 100 |
| BL200 Filler | 93.8 |
| Slag 3500 cm²/g | 60 |
| Optima 203 admixture | 2.3 |
| Total water | 164.2 |
| Effective water | 145 |

The quantity of filler is reduced in the G3-2 formula compared to the G3-1 formula because the sand used (crushed, not river) comprises a significant quantity of fines, which are taken into account in the complementary materials fraction.

| Formula G3-3 | |
| --- | --- |
| Cassis aggregates 6.3/10 | 941.5 |
| Honfleur sand 0/4R | 941.5 |
| Selected SPLC Cement dv97 = 16 μm | 100 |
| Calgar FV Filler | 218.8 |
| Slag 3500 cm$^2$/g | 60 |
| Optima 203 admixture | 2.5 |
| Total water | 164 |
| Effective water | 142 |

| Formula G3-4 | |
| --- | --- |
| Cassis aggregates 6.3/10 | 941.5 |
| Honfleur sand 0/4R | 941.5 |
| Selected SPLC Cement dv97 = 16 μm | 100 |
| Calgar 40 Filler | 217.9 |
| Slag 3500 cm$^2$/g | 60 |
| Optima 203 admixture | 3 |
| Total water | 163.6 |
| Effective water | 142 |

| Formula G3-5 | |
| --- | --- |
| Cassis aggregates 6.3/10 | 941.5 |
| Honfleur sand 0/4R | 941.5 |
| Selected SPLC Cement dv97 = 16 μm | 100 |
| Mikhart 15 Filler | 217.9 |
| Slag 3500 cm$^2$/g | 60 |
| Optima 203 admixture | 3.5 |
| Total water | 163.2 |
| Effective water | 142 |

| Formula G4-1 | |
| --- | --- |
| Cassis aggregates 6.3/10 | 920 |
| Honfleur sand 0/4R | 920 |
| Selected SPLC Cement dv97 = 16 μm | 120 |
| BL200 Filler | 126 |
| Slag 3500 cm$^2$/g | 100 |
| CHRYSOPLAST 209 admixture | 0.80 |
| Total water | 193 |
| Effective water | 171 |

| Formula G4-2 | |
| --- | --- |
| Cassis aggregates 6.3/10 | 920 |
| Honfleur 0/4R sand | 920 |
| Selected SPLC Cement dv97 = 16 μm | 120 |
| BL200 Filler | 144 |
| Slag 3500 cm$^2$/g | 80 |
| CHRYSOPLAST 209 admixture | 1.02 |
| Total water | 195 |
| Effective water | 173 |

The formulas G4-3 and G4-4 highlight the impact of the slag's fineness on its dosage.

| Formula G4-3 | |
| --- | --- |
| Cassis aggregates 6.3/10 | 920 |
| St Bonnet 0/5R sand | 920 |
| Micronised SPLC Cement dv97 = 15 μm | 120 |
| BL200 Filler | 144 |
| Slag 3260 cm$^2$/g | 80 |
| OMEGA 101 admixture | 0.86 |
| TBP admixture | 0.03 |
| Total water | 184.1 |
| Effective water | 161 |

| Formula G4-4 | |
| --- | --- |
| Cassis aggregates 6.3/10 | 920 |
| St Bonnet 0/5R sand | 920 |
| Micronised SPLC Cement dv97 = 15 μm | 120 |
| BL200 Filler | 181 |
| Slag 9150 cm$^2$/g | 40 |
| OMEGA 101 admixture | 1.07 |
| TBP admixture | 0.03 |
| Total water | 184.1 |
| Effective water | 161 |

| Formula C25/30 (reference) | |
| --- | --- |
| Cassis aggregates 6.3/10 | 900 |
| Honfleur 0/4R sand | 900 |
| CEM I 52.5 N HTS cement from Le Teil | 257 |
| BL200 Filler | 95 |
| CHRYSOPLAST 209 admixture | 0.54 |
| Total water | 189 |
| Effective water | 173 |

Example 5

Performance of Concretes According to the Invention

The performances of the concretes according to the invention are evaluated for the following points.
Compressive strength. This is determined according to the EN 12390-3 standard on cylindrical specimens, kept according to the EN 12390-2 standard at 20° C.±2° C. and relative humidity greater than 95%.

The results of the average compressive strength measurements are recorded in table 1 below: it shows in particular that the above formulations provide an average compressive strength greater than or equal to 4 MPa at 16 hours and greater than or equal to 25 MPa (even close to 30 MPa) at 28 days.

TABLE 1 average compressive strengths (in MPa) up to 28 days measured on a cylinder with a 70 mm diameter.

| | Duration: 16 hours | Duration: 24 hours | Duration: 28 days |
| --- | --- | --- | --- |
| ref C25/30 | nm | 9.8 | 32.2 |
| G3-1 | 5.4 | 6.3 | 29.8 |
| G3-2 | Nm | 7.5 | nm |

TABLE 1-continued average compressive strengths (in MPa) up to 28 days
measured on a cylinder with a 70 mm diameter.

|      | Duration: 16 hours | Duration: 24 hours | Duration: 28 days |
|------|--------------------|--------------------|-------------------|
| G3-3 | 5.4                | 6.5                | 29.1              |
| G3-4 | 5.4                | 6.9                | 29.1              |
| G3-5 | 5.5                | 6.7                | 29.2              |
| G4-1 | 6.1                | 7.9                | 36.8              |
| G4-2 | nm                 | nm                 | 30.1              |
| G4-3 | 4.1                | 6.1                | 29.4              |
| G4-4 | 4.1                | 6.2                | 28.1              | nm = not measured.

The rheology of the above concrete compositions is also evaluated. For this, a "static" and "vibrated" measurement of the spread is carried out as follows:

The ASTM cone described in the ASTM C230 Standard is used. The cone is positioned on a vibrating electromagnetic SINEX TS100 table equipped with a square platen, 600 mm×600 mm (frequency 50 Hz, amplitude 0.5 mm). The spread measurement is carried out on a dry surface. The spread is measured in three directions, the average value, rounded to the nearest 5 mm is recorded.

Preparation: 2 liters of dry mixture are introduced into the tank; this is mixed for 30 seconds at low speed; the mixer is stopped; the total quantity of water and liquid admixture is introduced; mixing is carried out for 2 minutes at low speed. At the end of mixing, that is, 2 minutes after contact with the water (T=2 min), the cone is filled in one go and levelled, then the cone is lifted.

At T=3 min, the "static" spread is measured after waiting one minute.

At T=3 min 15, vibration is started at 50 Hz and 0.5 mm amplitude for 30 seconds.

At T=3 min 45, the "vibrated" spread is measured.

The concrete is recovered and kept in a closed plastic bag in order to avoid drying between measurements. Before each sampling the paste is slightly agitated using a spatula.

At T=10 min, the cone is filled in one go, levelled then the cone is lifted.

At T=11 min, the "static" spread is measured after waiting one minute.

At T=11 min 15, vibration is started at 50 Hz and 0.5 mm amplitude for 30 seconds.

At T=11 min 45, the "vibrated" spread is measured.

The results are given in table 2 below. They show that the concretes formulated according to the invention have acceptable performances in terms of rheology, just as good as those of a standard C25/30 concrete. The difference between the results obtained with and without vibrations highlights a fluid threshold behaviour (like a standard C25/30 concrete).

TABLE 2 rheological performance (spreads are given in mm)

|        | 3-minute spread static | 11-minute spread static | 3 min 45 spread vibrated | 11 min 45 spread vibrated |
|--------|------------------------|-------------------------|--------------------------|---------------------------|
| C25/30 | 95                     | 95                      | 225                      | 225                       |
| G3-1   | 95                     | 95                      | 230                      | 230                       |
| G3-2   | 100                    | 100                     | 225                      | 225                       |
| G3-3   | 90                     | 90                      | 225                      | 220                       |
| G3-4   | 90                     | 90                      | 225                      | 220                       |
| G3-5   | 90                     | 90                      | 225                      | 225                       |
| G4-1   | 100                    | 100                     | 220                      | 215                       |
| G4-2   | nm                     | 95                      | nm                       | 225                       |
| G4-3   | 95                     | nm                      | 215                      | nm                        |
| G4-4   | 100                    | nm                      | 215                      | nm                        | nm = not measured.

The invention claimed is:

1. A process for the preparation of a wet concrete composition, comprising a stage of mixing of:

Portland clinker in the form of grains having a Dv97 from 10 to 30 μm or having a Blaine specific surface greater than or equal to 5300 cm²/g, the minimum quantity of the clinker in kg/m³ being determined according to formula (V) for a clinker having a Dv97 from 10 to 30 μm, or according to formula (VI) for a clinker having a Blaine specific surface greater than or equal to 5300 cm²/g:

$$[(90 \times \ln(Dv97_k)) - 150] \times (W_{\mathit{eff}} \div 140) \quad \text{Formula (V)}$$

in which $Dv97_k$ is the DV97 of the clinker given in μm, $W_{\mathit{eff}}$ is the quantity of effective water in l/m³;

$$[(-0.021 \times BSS_k) + 263] \times (W_{\mathit{eff}} \div 140) \quad \text{Formula (VI)}$$

in which $BSS_k$ is the Blaine specific surface of the clinker given in cm²/g,
$W_{\mathit{eff}}$ is the quantity of effective water in l/m³;

slag, of which the minimum quantity in kg/m³ is determined according to formula (VII) in the case of a mixture with clinker having a Dv97 from 10 to 30 μm, or according to formula (VIII) in the case of a mixture with clinker having a Blaine specific surface greater than or equal to 5300 cm²/g:

$$(3500 \div BSS_S) \times [-90 \times \ln(Dv97_k) + 310] \times (W_{\mathit{eff}} \div 140) \quad \text{Formula (VII)}$$

in which $Dv97_k$ is the Dv97 of the clinker given in μm, $BSS_S$ is the Blaine specific surface of the slag given in cm²/g,
$W_{\mathit{eff}}$ is the quantity of effective water in l/m³;

$$(3500 \div BSS_S) \times [0.021 \times BSS_k - 103] \times (W_{\mathit{eff}} \div 140) \quad \text{Formula (VIII)}$$

in which $BSS_k$ and $BSS_S$ are respectively the Blaine specific surface of the clinker and the slag given in cm²/g,
$W_{\mathit{eff}}$ is the quantity of effective water in l/m³;

calcium sulphate;

complementary materials, having a Dv90 less than or equal to 200 μm, of which the minimum quantity in kg/m³ is determined according to the following formula (IX):

$$220 - (\text{quantity of slag}) - (\text{quantity of clinker}) - (\text{quantity of calcium sulphate}) \quad \text{Formula (IX)};$$

from 1500 to 2200 kg/m³ of aggregates;
a plasticizer;
optionally an accelerator and/or an air-entraining agent and/or a thickening agent and/or a retarder and/or a clay-inerting agent; with
140 to 220 l/m³ of effective water,
the total quantity of clinker in the wet concrete being less than or equal to 200 kg/m³.

2. The process for preparation of a wet concrete composition according to claim 1, wherein the grains of the Portland clinker have a Blaine specific surface greater than or equal to 5500 cm²/g.

3. The process for preparation of a wet concrete composition according to claim 1, wherein the quantity of effective water used varies from 140 to 200 l/m³.

4. The process for preparation of a wet concrete composition according to claim 3, wherein the quantity of effective water used varies from 150 to 180 l/m³.

5. A wet concrete composition obtained by the process according to claim 1.

6. A hardened concrete object obtained from the wet concrete composition according to claim 5.

7. The process for preparation of a wet concrete composition according to claim 1, comprising from 1700 to 2000 kg/m³ of said aggregates.

8. The process for preparation of a wet concrete composition according to claim 1, wherein the complementary materials are selected from the group consisting of fly ash, limestone powder, calcined shale, metakaolin, siliceous filler, silica powder, pozzolan, slag, or clinker and a mixture thereof.

* * * * *